United States Patent [19]

Becker

[11] Patent Number: 4,686,397
[45] Date of Patent: Aug. 11, 1987

[54] BRUSH AND COMMUTATOR SEGMENT TORQUER MOTOR

[75] Inventor: Jack W. Becker, Simi Valley, Calif.

[73] Assignee: The United States of America as represented by the Secretary of the Air Force, Washington, D.C.

[21] Appl. No.: 903,361

[22] Filed: Sep. 3, 1986

Related U.S. Application Data

[63] Continuation-in-part of Ser. No. 721,836, Apr. 11, 1985, abandoned.

[51] Int. Cl.⁴ ...................... H02K 13/00; H02K 41/06
[52] U.S. Cl. ...................................... 310/36; 310/233; 335/272; 343/766
[58] Field of Search ...................... 310/15, 12, 13, 17, 310/21, 29, 36, 38, 67 R, 233; 74/5.46, 5.6 E; 318/130; 335/272; 354/234; 343/757, 766

[56] References Cited

U.S. PATENT DOCUMENTS

| | | | |
|---|---|---|---|
| 2,814,743 | 11/1957 | Johnson | 310/36 |
| 3,070,733 | 12/1962 | Ziegler | 310/13 |
| 3,130,591 | 4/1964 | Paddick et al. | 74/5.46 |
| 3,327,541 | 6/1967 | Clark et al. | 74/5.46 |
| 3,813,566 | 5/1974 | Edwards et al. | 310/27 |
| 4,036,453 | 7/1977 | Evans et al. | 244/3.16 |
| 4,079,400 | 3/1978 | Kondo | 310/13 |
| 4,104,787 | 8/1978 | Jandeska et al. | 310/154 |
| 4,250,416 | 2/1981 | Watanabe et al. | 310/13 |
| 4,398,167 | 8/1983 | Dickie et al. | 335/272 |

FOREIGN PATENT DOCUMENTS 428724 of 0000 France .................................. 310/12

OTHER PUBLICATIONS

Two portions (A & B) from Inland Motor Catalog, Inland Motors, Kollmorgen Corporation, 501 First Street, Radford, VA 24143.

Primary Examiner—Patrick R. Salce
Assistant Examiner—D. Rebsch
Attorney, Agent, or Firm—Jacob N. Erlich; Donald J. Singer

[57] ABSTRACT

A non-continuous brush and commutator segment torquer motor having a single radial air gap. The motor can be placed on the opposite side of the gimbal center line of a payload. This arrangement minimizes torquer mass, as well as providing greater clearance for the gimbal payload to travel through larger angular excursions. Hence, all payloads which are gimbal mounted, such as radar antennas, can be located closer to the gimbal center and can be driven through larger look angles.

1 Claim, 2 Drawing Figures

BRUSH AND COMMUTATOR SEGMENT TORQUER MOTOR

STATEMENT OF GOVERNMENT INTEREST

The invention described herein may be manufactured and used by or for the Government for governmental purposes without the payment of any royalty thereon.

RELATED APPLICATION

This application is a continuation-in-part of U.S. patent application Ser. No. 721,836, filed Apr. 11, 1985, now abandoned, entitled Brush and Commutator Segment Torquer Motor.

BACKGROUND OF THE INVENTION

The present invention relates to torquer motors, and more particularly, to a brush and commutator segment torquer.

The direct-drive DC torquer motor is a servo actuator which can be directly attached to the load it drives. It has a permanent magnet field and a wound armature which act together to convert electrical power to torque. This torque can then be utilized in positioning or speed-control systems. Direct-drive torque motors are particularly suited for servo-system applications where it is desirable to minimize size, weight, power and response time, and to maximize rate and position accuracies. Torque motors have the following important advantages over other servo-system actuators: high torque-to-inertia ratio at the load; high torque-to-power ratio; low electrical time constant; high linearity; reliability and long life; and compact, adaptable design.

Frameless torque motors are intended to be "designed-in" as an integral part of a system, thus saving the weight and space associated with conventional motor frames or housings. The frameless design allows the motors to be mounted anywhere along a driven shaft. Hence, coupling stiffness can be improved, and the backlash normally associated with couplings or gear trains can thus be eliminated. Also, the commonly employed "pancake" configuration minimizes the volume required for mounting. The frameless motor concept was developed to meet the need for motors with a large hole through the center. This need is still one of the main reasons that the large diameter, narrow width frameless configuration is often selected over the traditional housed configuration. The large rotor bore can be used as a route for lead wires, as a mounting area for other hardware such as tachometer generators or resolvers, or as an optical path.

The basic frameless torque motor comprises a permanent magnet field on the stator, an armature having a laminated stack of windings with a commutator affixed thereto on the rotor, including a brush ring or brush assembly. Rare earth magnets, such as samarium cobalt magnets, are currently available for use as the permanent magnets of the stator. These magnets have the major advantages of maintenance of magnetic characteristics in momentary overcurrent conditions and lower inductance values compared to comparable conventional magnets. Hence, the rare earth magnets provide a more rapid system response, and also can produce more torque per volume than conventional magnet types of similar dimensions.

In application of the rare earth magnet field design it is known to magnetize such magnets in a radial direction. The conventional (such as Alnico) field assembly is magnetized in a circumferential direction. The radial orientation of the rare earth design, along with the unique properties of the magnet material, combine to reduce the leakage flux in the motor. This not only improves the motor performance because motor flux is retained within the magnetic circuit of the motor, but there is also a much lower flux density around the outside of the motor. There is, therefore, less interference in neighboring wires and electronic or electromagnetic devices, which is an important consideration in the design and operation of certain sensitive electronic equipment.

Rare earth designs feature a thinner stator assembly, where the rotor therefore can have a larger diameter, compared to a conventional motor having the same stator outer diameter. Hence, an improved motor constant results from an available larger rotor diameter and a higher flux density.

Brush and commutator torque motors have been known in the art for many years. These motors typically incorporate 360° continuous magnet ring assemblies and wound laminated stacks. There are applications, however, where 360° rotation is not required, and where the bulk of the continuous 360° torquer impinges upon system characteristics and performance. For example, the antenna azimuth or elevation angle antenna dish positioner in the Wasp Tactical Seeker System must drive the antenna dish through a 36° conical look angle, and must do this in a small package. Hence, the features of a torquer are desirable but the bulk of a continuous torquer is contraindicated.

A known brushless, electronically commuted torquer motor is disclosed in U.S. Pat. No. 3,130,591. This device achieves commutation by means of external electronic devices. Nevertheless, such design is not practical for use in systems where cost, efficiency or weight are important considerations. Furthermore, it is designed with two flat face air gaps defined between respective pole piece faces, although the efficiency of a single radial air gap is preferrable.

It is therefore an object of the present invention to provide a segment torquer motor having brush and commutator on board.

It is an additional object of the present invention to provide a brush and commutator segment torquer motor having a single radial air gap.

Yet an additional object of the present invention is to provide a brush and commutator segment torquer motor which can be driven through wide look angles.

SUMMARY OF THE INVENTION

The present invention comprises a non-continuous brush and commutator segment torquer motor having a single radial air gap. The motor can be placed on the opposite side of the gimbal center line of a payload. This arrangement minimizes torquer mass, as well as providing greater clearance for the gimbal payload to travel through larger angular excursions. Hence, all payload which are gimbal mounted, such as radar antennas, can be located closer to the gimbal center and can be driven through larger look angles.

BRIEF DESCRIPTION OF THE DRAWINGS

The invention will be more clearly understood by reference to the following detailed description of a preferred embodiment thereof in conjunction with the accompanying drawings, in which.

DETAILED DESCRIPTION OF THE PREFERRED EMBODIMENT

Figure 1:
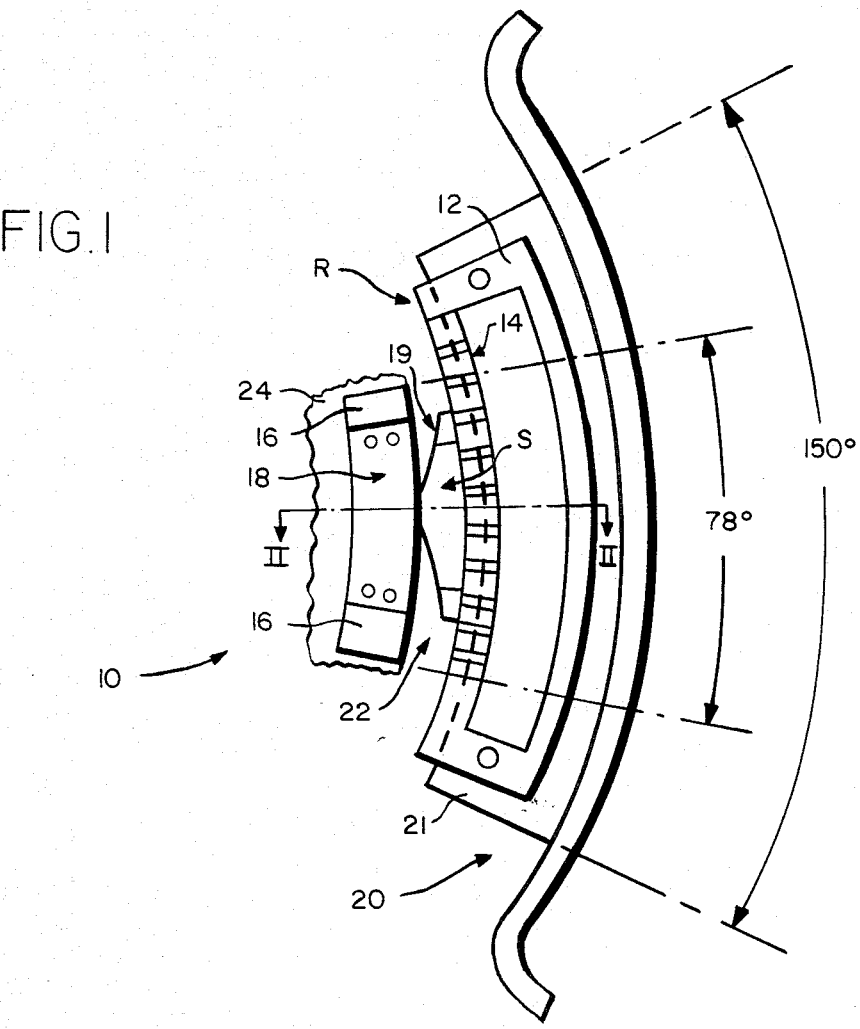
FIG. 1 is a top plan view of an exemplary embodiment of the present invention.

Referring now to the top plan view of FIG. 1, a portion of a radar antenna assembly is shown comprising a frame 24 which is held in fixed relationship to a gimbaled antenna dish assembly 20, with assembly 20 being part of the outer gimbal having one degree of freedom. As seen in FIG. 1, an exemplary embodiment of the present inventive torquer motor 10 comprises a rotor (R) including an armature 12 in the form of a laminated stack made of silicon steel or nickel steel, with a multiplicity of commutator bars 14 mounted on armature 12. More specifically, the commutator bars 14 lie along the plane of curvature of rotor (R). Rotor R is affixed to a mounting plate 21 of the antenna dish assembly 20. The invention also comprises a stator (S), including a rare earth permanent magnet field 16, where a brush block assembly 18 including brushes 19 is mounted on the operative side face of stator S. Stator S is mounted on fixed frame 24. Thus, in this illustrative torquer embodiment, the field is part of the torquer stator S and the armature is part of the torquer rotor R, although the reverse configuration is also feasible. Between the respective opposed faces or, stated more succinctly, the inner face of rotor R and the outer face of stator S there is defined a single radial air gap 22. Also shown in this figure are exemplary dimensions where the rotor comprises a 150° segment and the stator comprises a 78° segment (angles not drawn to scale for purposes of clarity), although many other configurations are equally within the spirit and scope of the present invention. These dimensions facilitate overlap of the stator with the rotor while achieving the 36° conical (72° combined) look angle desired in the Wasp Tactical Seeker.

Figure 2:
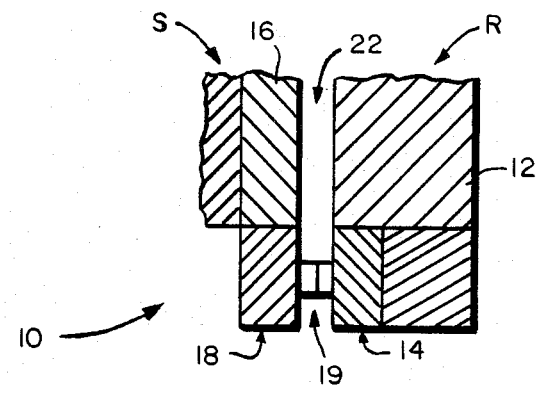
FIG. 2 is a partial cross-sectional view of the invention taken along lines II-II of FIG. 1, shown in segmented fashion.

Reference is now made to FIG. 2 of the drawings which is a cross-sectional view of torquer motor 10 taken along line II—II of FIG. 1. This figure clearly illustrates the relationship between the single air gap 22, rare earth permanent magnet field 16, brush block assembly 18, brushes 19, commutator bars 14 and armature 12. As shown therein, brushes 19 bridge the single air gap 22 making contact with commutator bars 14 as the Rotor rotates with respect to the Stator.

While the present invention has been described in connection with rather specific embodiments thereof, it will be understood that many modifications and variations will be readily apparent to those of ordinary skill in the art and that this application is intended to cover any adaptation or variation thereof. Therefore, it is manifestly intended that this invention be only limited by the claims and the equivalents thereof.

What is claimed is:

1. A brush and commutator segment torquer motor comprising:

an electromagnetically cooperating stator and rotor, said stator and rotor each defining less than 360° segments, respectively, said rotor being disposed on the outside of said stator and including a multiplicity of commutator bars at the inner surface thereof, said commutator bars lying along the plane of curvature of said rotor, said stator having a rare earth permanent magnet field and a brush block assembly including brushes at the outer surface thereof, said brushes contacting said commutator bars at said inner surface, and only a single air gap being radially disposed between said inner surface of said rotor and said outer surface of said stator.

* * * * *